(12) United States Patent
Dohi et al.

(10) Patent No.: US 8,427,752 B2
(45) Date of Patent: Apr. 23, 2013

(54) ILLUMINATION APPARATUS AND MICROSCOPE HAVING THE SAME

(75) Inventors: Masahito Dohi, Tokyo (JP); Kenji Kawasaki, Tokyo (JP)

(73) Assignee: Olympus Corporation, Tokyo (JP)

(*) Notice: Subject to any disclaimer, the term of this patent is extended or adjusted under 35 U.S.C. 154(b) by 327 days.

(21) Appl. No.: 12/755,512

(22) Filed: Apr. 7, 2010

(65) Prior Publication Data
US 2010/0271696 A1 Oct. 28, 2010

(30) Foreign Application Priority Data
Apr. 22, 2009 (JP) ................. 2009-104243

(51) Int. Cl.
*G02B 11/00* (2006.01)
(52) U.S. Cl.
USPC .......................... 359/642; 359/385
(58) Field of Classification Search .......... 359/385, 359/641–642
See application file for complete search history.

(56) References Cited

U.S. PATENT DOCUMENTS

| | | | | |
|---|---|---|---|---|
| 3,476,463 A | * | 11/1969 | Kreuzer | 359/717 |
| 6,014,262 A | * | 1/2000 | Noda | 359/641 |
| 6,104,541 A | * | 8/2000 | Otomo | 359/641 |
| 6,236,512 B1 | * | 5/2001 | Nakai | 359/641 |
| 6,280,058 B1 | * | 8/2001 | Horigome | 362/268 |
| 6,688,758 B2 | * | 2/2004 | Thibault | 362/368 |
| 7,180,661 B2 | * | 2/2007 | Sasaki | 359/385 |
| 7,193,791 B2 | * | 3/2007 | Hirai et al. | 359/707 |
| 7,369,308 B2 | * | 5/2008 | Tsuruta et al. | 359/388 |
| 2005/0254123 A1 | * | 11/2005 | Mizusawa | 359/368 |

FOREIGN PATENT DOCUMENTS

| | | |
|---|---|---|
| JP | 2000-131615 A | 5/2000 |
| JP | 2005-208571 A | 8/2005 |

* cited by examiner

*Primary Examiner* — Thong Nguyen
(74) *Attorney, Agent, or Firm* — Holtz, Holtz, Goodman & Chick, P.C.

(57) ABSTRACT

An illumination apparatus includes a light source and a collimator optical system converting light emitted from the light source to approximately-parallel light. The collimator optical system includes, in an order of proximity to the light source, a first lens having a positive power and including an approximately-flat surface and an aspheric surface, and a second lens having a positive power.

9 Claims, 19 Drawing Sheets

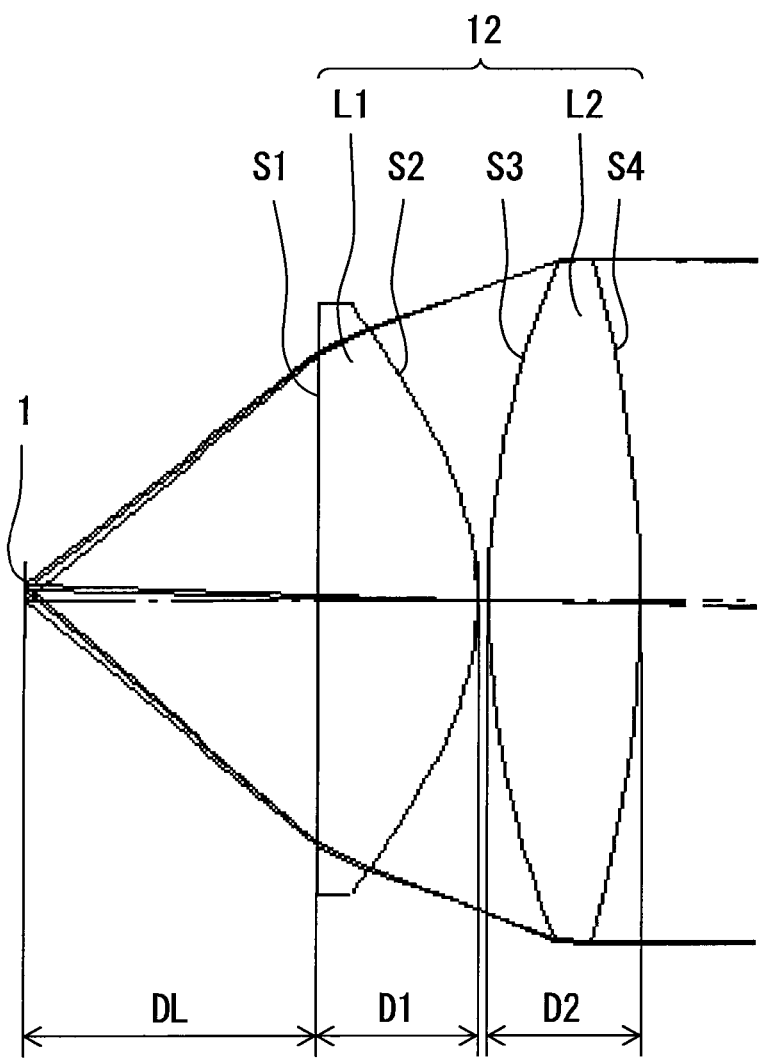
F I G. 4

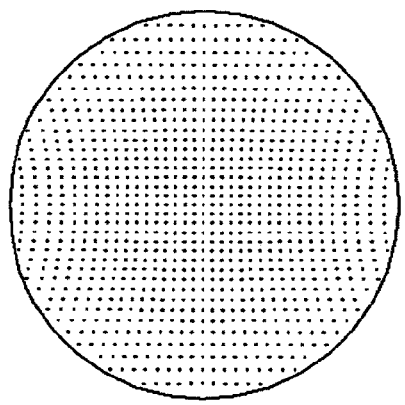
F I G. 5 A
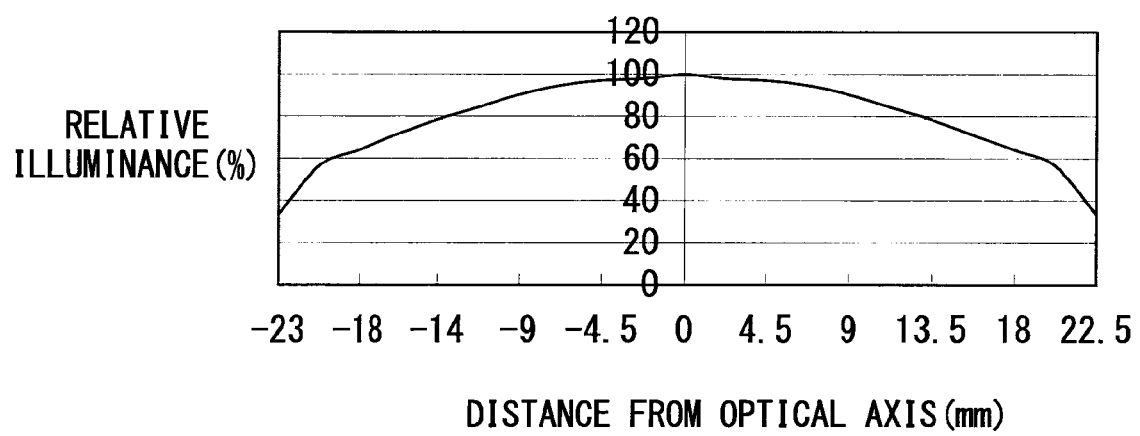
F I G. 5 B

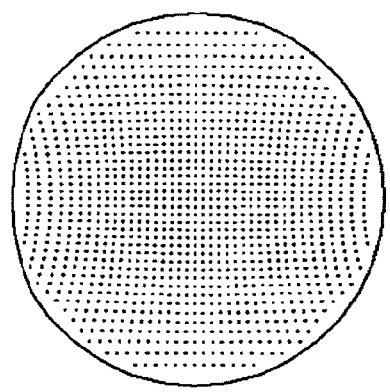
F I G. 7 A
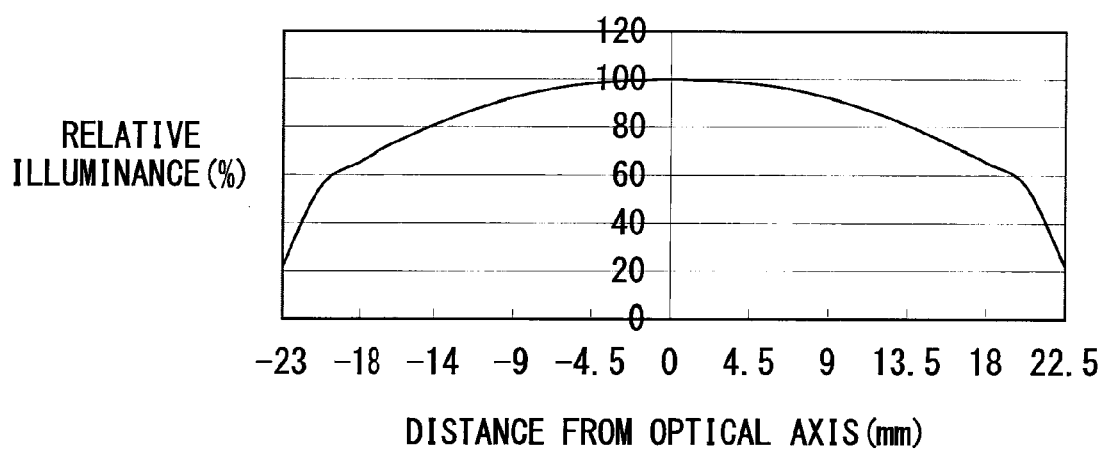
F I G. 7 B

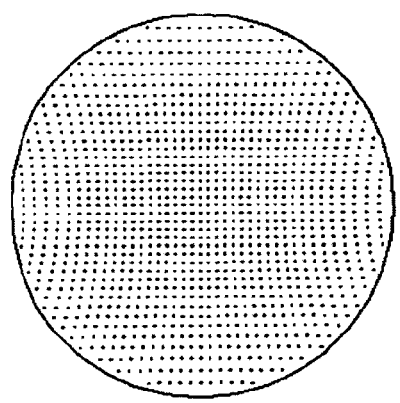
F I G. 9 A
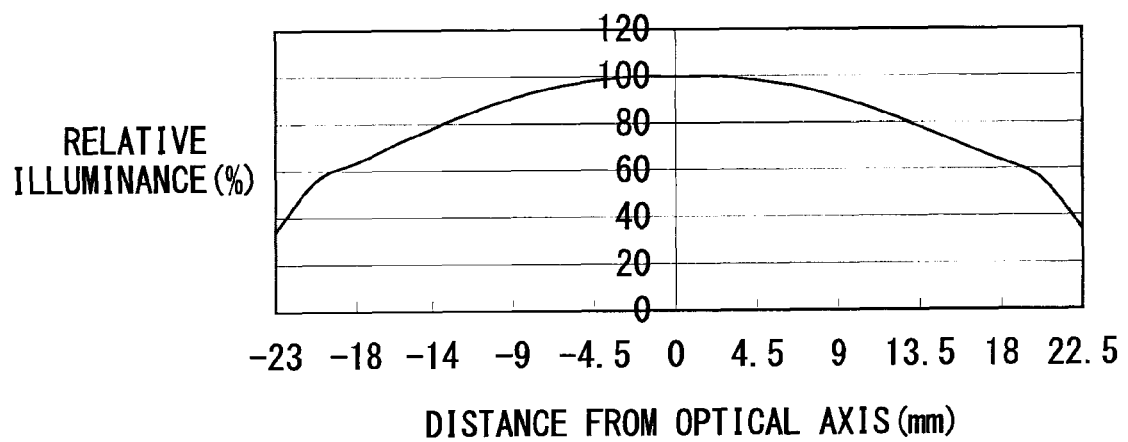
F I G. 9 B

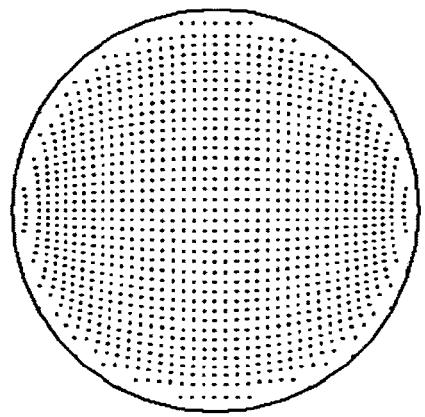
F I G. 1 1 A
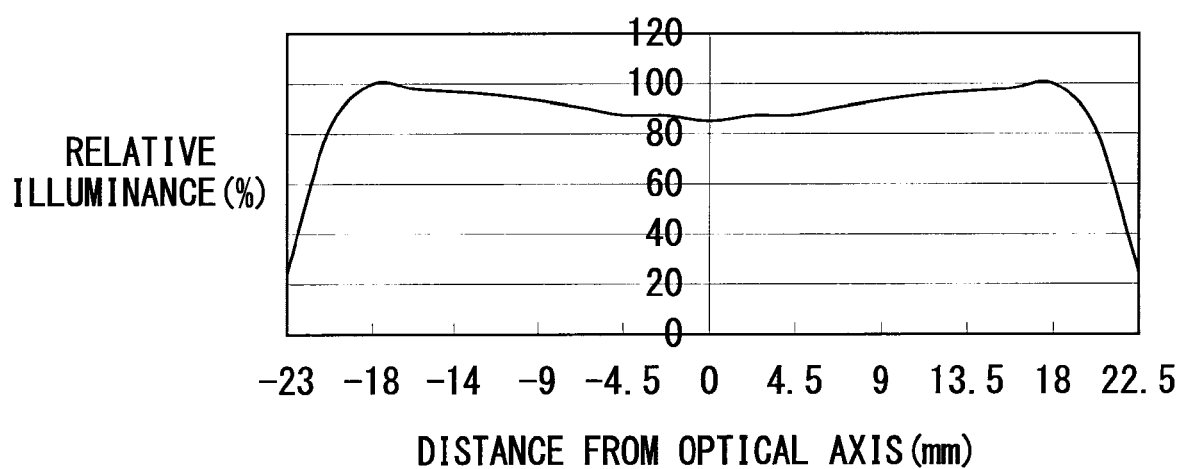
F I G. 1 1 B

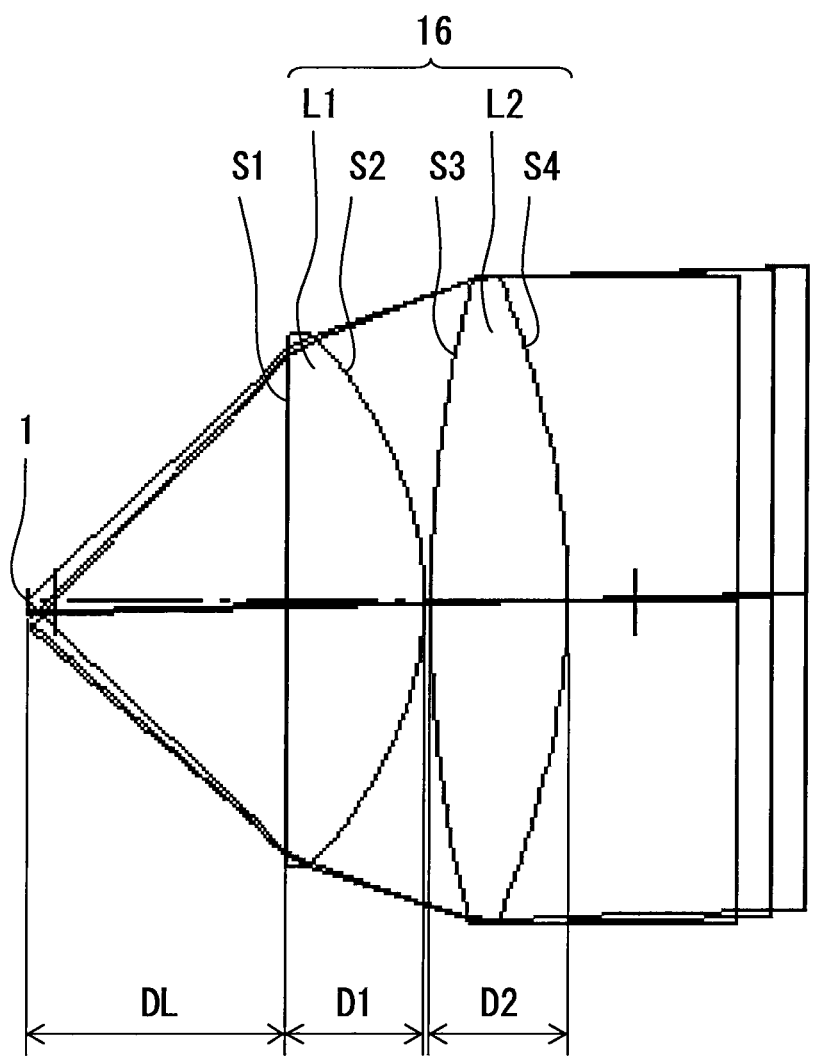
F I G. 1 2

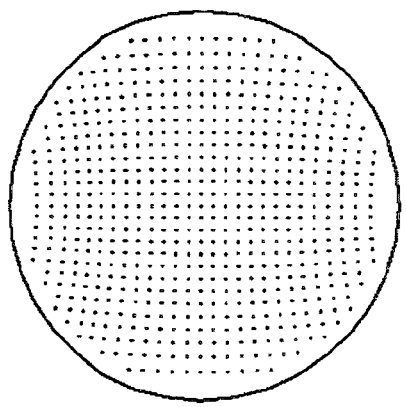
F I G. 1 3 A
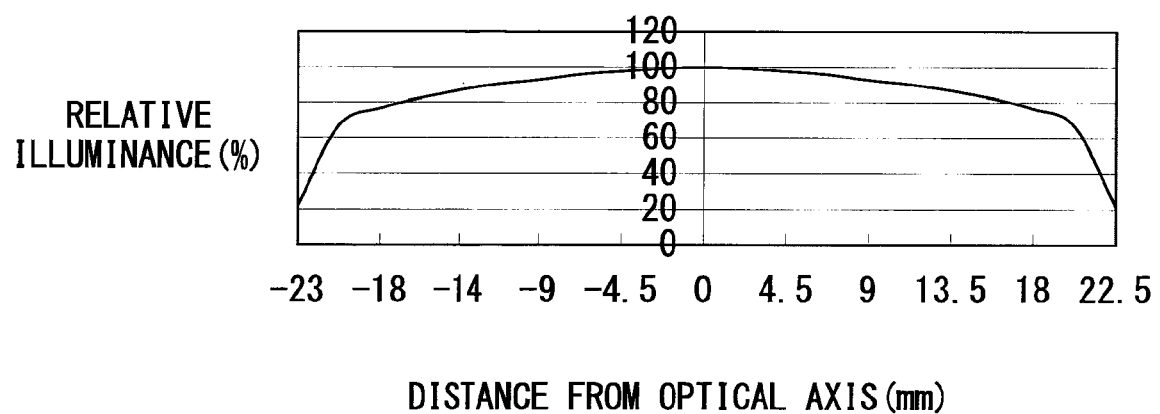
F I G. 1 3 B

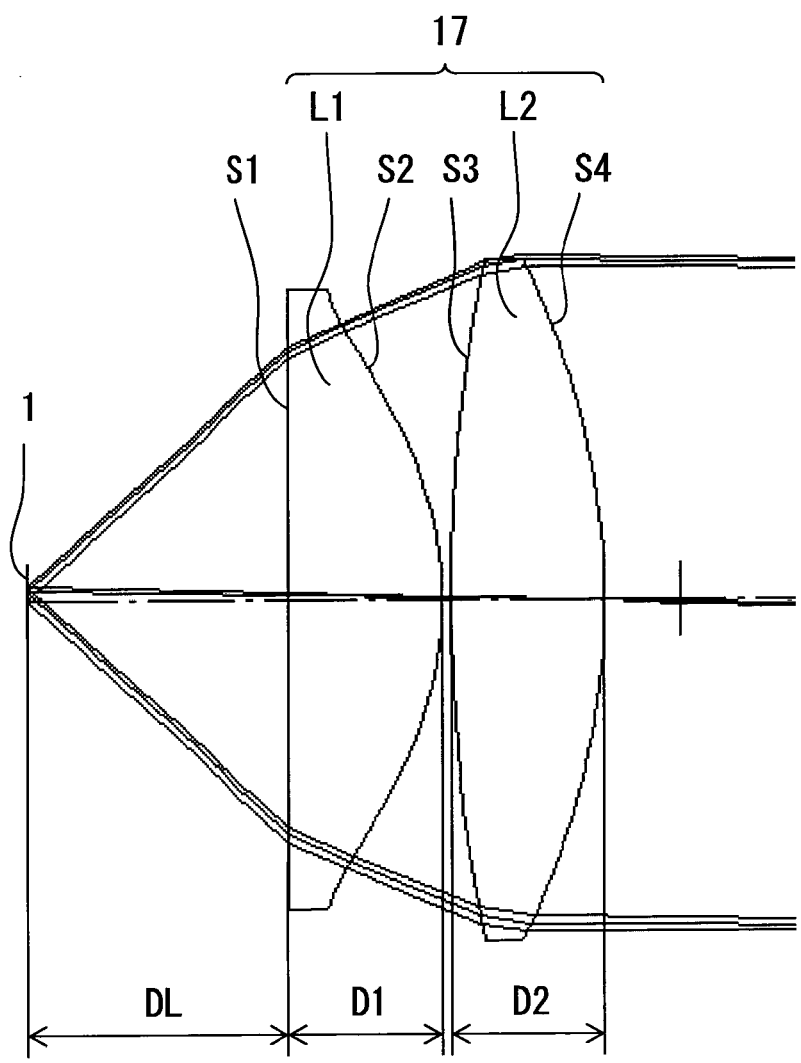
F I G. 1 4

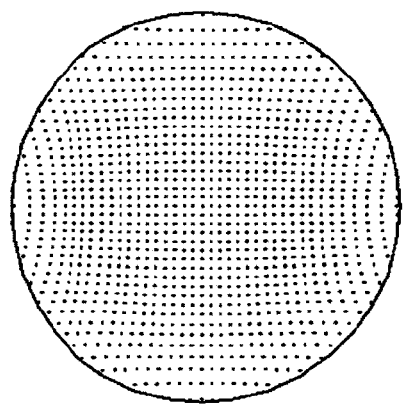
F I G. 1 5 A
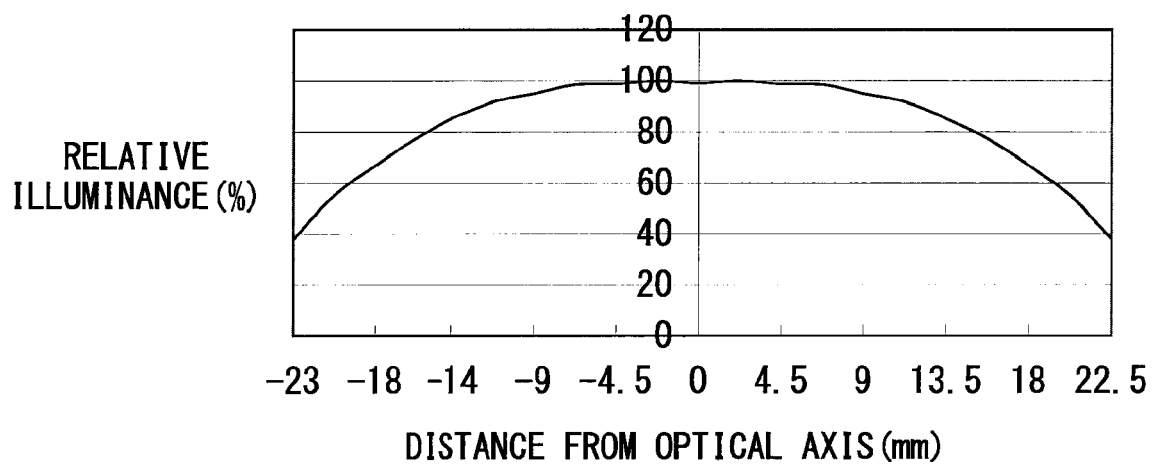
F I G. 1 5 B

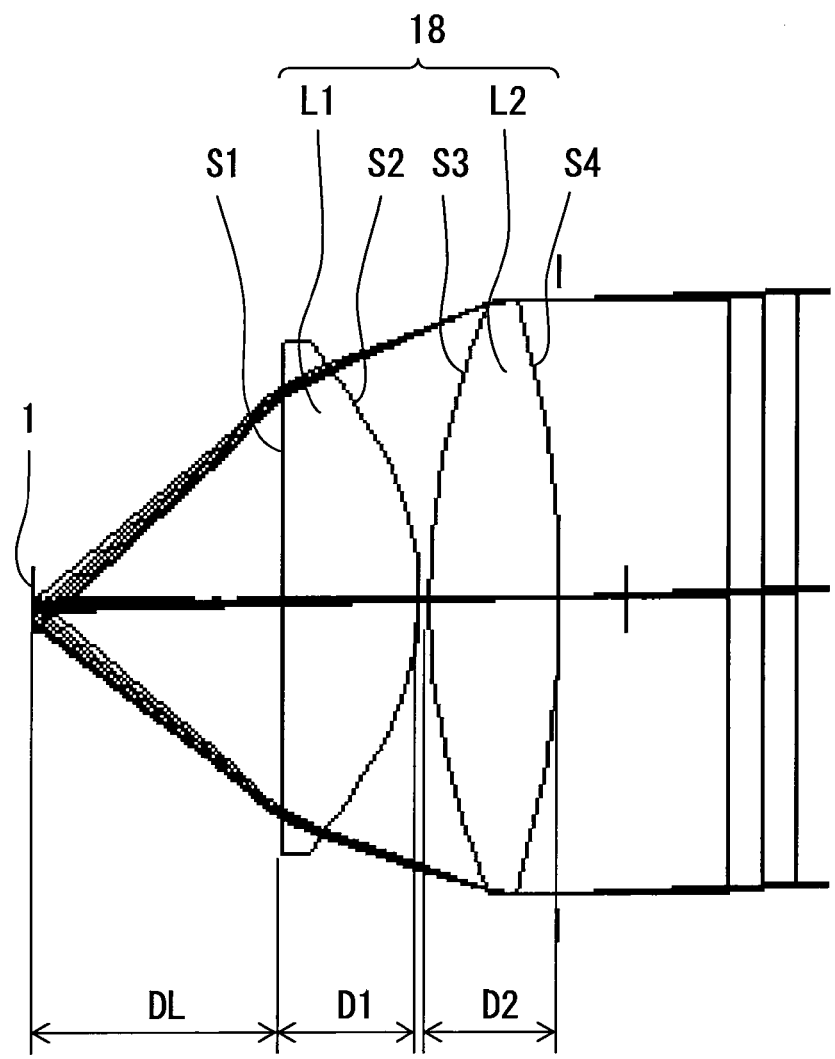
F I G. 1 6

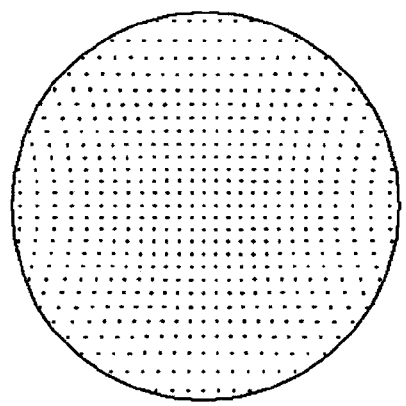
F I G. 1 7 A
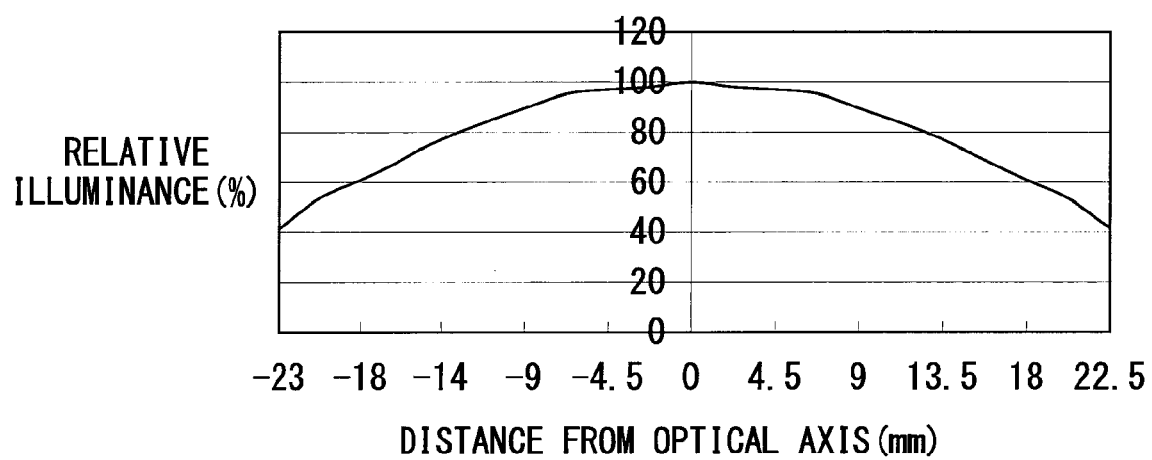
F I G. 1 7 B

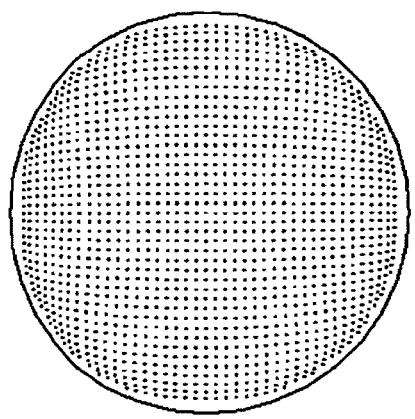
F I G. 1 9 A
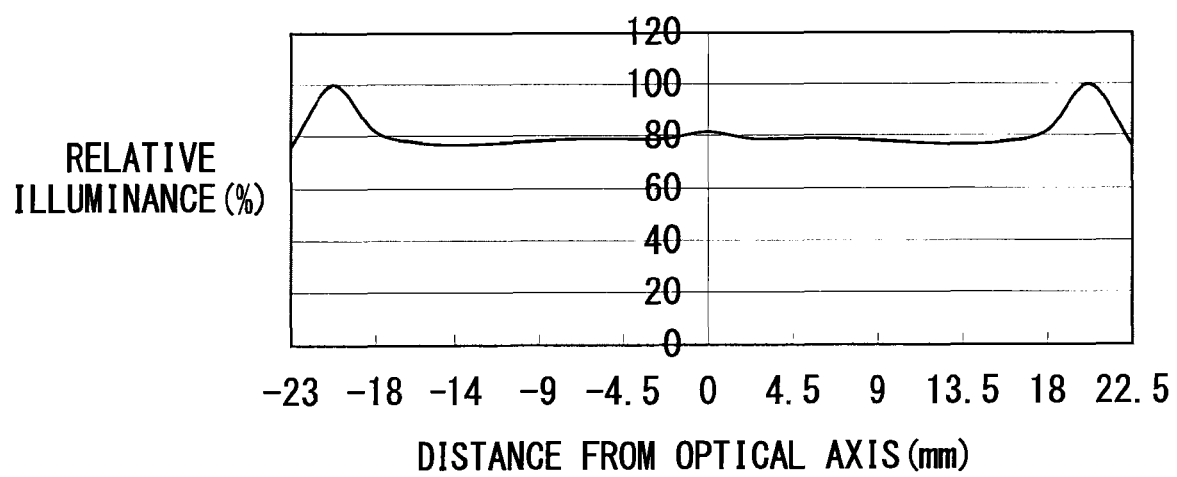
F I G. 1 9 B

ILLUMINATION APPARATUS AND MICROSCOPE HAVING THE SAME

CROSS-REFERENCE TO RELATED APPLICATIONS

This application is based upon and claims the benefit of priority from the prior Japanese Patent Application No. 2009-104243, filed Apr. 22, 2009, the entire contents of which are incorporated herein by this reference.

BACKGROUND OF THE INVENTION

1. Field of the Invention

The present invention relates to an illumination apparatus and a microscope having the illumination apparatus.

2. Description of the Related Art

Generally, an illumination apparatus is configured to include, in the vicinity of a light source, a collector lens for taking in diverging light emitted from the light source. In order to take in the diverging light efficiently by a collector lens, it is effective to make the focal length of the collector lens short and make the distance between the collector lens and the light source short.

For this reason, in an illumination apparatus, the popular configuration uses a meniscus lens whose concave surface facing the light source as a lens of the collector lens closest to the light source. An illumination apparatus configured in such a way is disclosed in, for example, Japanese Laid-open Patent Publication No. 2005-208571.

SUMMARY OF THE INVENTION

An aspect of the present invention provides an illumination apparatus including a light source; and a collimator optical system converting light emitted from the light source to approximately-parallel light, in which the collimator optical system includes, in an order of proximity to the light source, a first lens having a positive power and including an approximately-flat surface and an aspheric surface; and a second lens having a positive power.

Another aspect of the present invention provides a microscope including an illumination apparatus; an objective lens taking in observation light from a sample illuminated by the illumination apparatus; and an image-forming optical system making the observation light having passed through the objective lens form an image, in which the illumination apparatus includes a light source; and a collimator optical system converting light emitted from the light source to approximately-parallel light, and the collimator optical system includes, in an order of proximity to the light source, a first lens having a positive power and including an approximately-flat surface and an aspheric surface; and a second lens having a positive power.

BRIEF DESCRIPTION OF THE DRAWINGS

The present invention will be more apparent from the following detailed description when the accompanying drawings are referenced.

FIG. 4 is a diagram illustrating the configuration of collector lenses according to embodiment 2 of the present invention.

FIG. 5A is a diagram illustrating the distribution of a light beam emitted from a light source with equal angles and in a lattice form after transmitting through the collector lens of FIG. 4.

FIG. 5B is a diagram illustrating the illuminance distribution in a case in which the light source is an ideal light source with the light distribution angle being even, where the highest illuminance of the illumination light emitted from the collector lens of FIG. 4 is set to 100%.

FIG. 7A is a diagram illustrating the distribution of a light beam emitted from a light source with equal angles and in a lattice form after transmitting through the collector lens of FIG. 6.

FIG. 7B is a diagram illustrating the illuminance distribution in a case in which the light source is an ideal light source with the light distribution angle being even, where the highest illuminance of the illumination light emitted from the collector lens of FIG. 6 is set to 100%.

FIG. 9A is a diagram illustrating the distribution of a light beam emitted from a light source with equal angles and lattice form after transmitting through the collector lens of FIG. 8.

FIG. 9B is a diagram illustrating the illuminance distribution in a case in which the light source is an ideal light source with the light distribution angle being even, where the highest illuminance of the illumination light emitted from the collector lens of FIG. 8 is set to 100%.

FIG. 11A is a diagram illustrating the distribution of a light beam emitted from a light source with equal angles and lattice form after transmitting through the collector lens of FIG. 10.

FIG. 11B is a diagram illustrating the illuminance distribution in a case in which the light source is an ideal light source with the light distribution angle being even, where the highest illuminance of the illumination light emitted from the collector lens of FIG. 10 is set to 100%.

FIG. 12 is a diagram illustrating the configuration of collector lenses according to embodiment 6 of the present invention.

FIG. 13A is a diagram illustrating the distribution of a light beam emitted from a light source with equal angles and in a lattice form after transmitting through the collector lens of FIG. 12.

FIG. 13B illustrating the illuminance distribution in a case in which the light source is an ideal light source with the light distribution angle being even, where the highest illuminance of the illumination light emitted from the collector lens of FIG. 12 is set to 100%.

FIG. 14 is a diagram illustrating the configuration of collector lenses according to embodiment 7 of the present invention.

FIG. 15A is a diagram illustrating the distribution of a light beam emitted from a light source with equal angles and in a lattice form after transmitting through the collector lens of FIG. 14.

FIG. 15B is a diagram illustrating the illuminance distribution in a case in which the light source is an ideal light source with the light distribution angle being even, where the highest illuminance of the illumination light emitted from the collector lens of FIG. 14 is set to 100%.

FIG. 16 is a diagram illustrating the configuration of collector lenses according to embodiment 8 of the present invention.

FIG. 17A is a diagram for illustrating the distribution of a light beam emitted from a light source with equal angles and in a lattice form after transmitting through the collector lens of FIG. 16.

FIG. 17B is a diagram illustrating the illuminance distribution in a case in which the light source is an ideal light source with the light distribution angle being even, where the highest illuminance of the illumination light emitted from the collector lens of FIG. 16 is set to 100%.

FIG. 19A is a diagram illustrating the distribution of a light beam emitted from a light source with equal angles and in a lattice form after transmitting through the collector lens of FIG. 18.

FIG. 19B is a diagram illustrating the illuminance distribution in a case in which the light source is an ideal light source with the light distribution angle being even, where the highest illuminance of the illumination light emitted from the collector lens of FIG. 18 is set to 100%.

DESCRIPTION OF THE PREFERRED EMBODIMENTS

Hereinafter, respective embodiments of the present invention are described with reference to the drawings. First, common configurations and operations of the embodiments are described.

Figure 1:
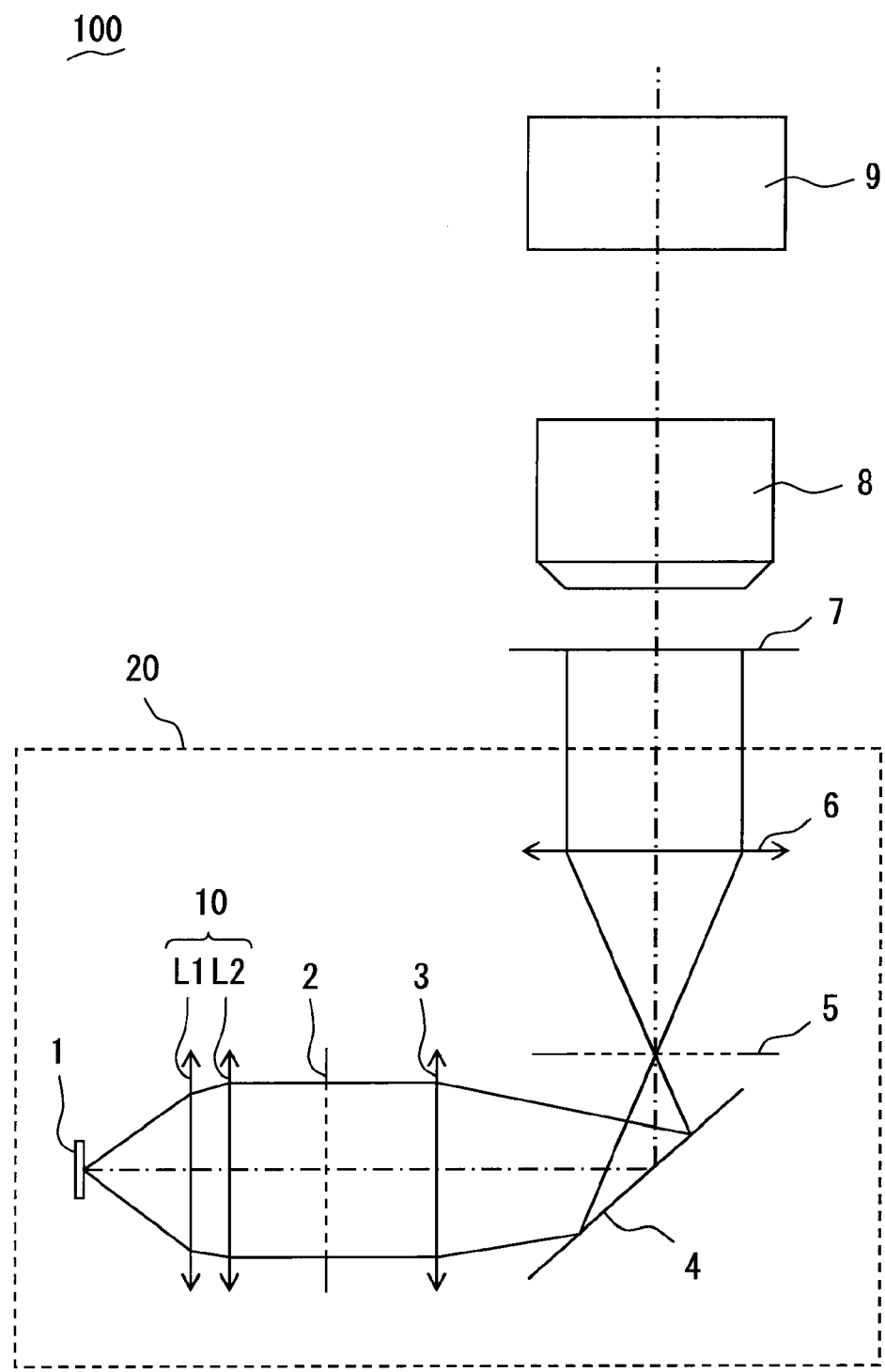
FIG. 1 is a diagram describing the configuration of a microscope having an illumination apparatus according to an embodiment of the present invention.

FIG. 1 is a diagram illustrating the configuration of a microscope having an illumination apparatus according to an embodiment of the present invention. As illustrated in FIG. 1, a microscope 100 is configured to include an illumination apparatus 20, an objective 8 and a tube lens 9. The illumination apparatus 20 is configured to include a light source 1, collector lenses 10, a field stop 2, a relay lens 3, a mirror 4, an aperture stop 5 and a condenser lens 6.

Illumination light emitted from the light source 1 enters the collector lenses 10 configured as a collimator optical system. The collector lenses 10 convert the illumination light into approximately-parallel light, and make it enter the relay lens 3 through the field stop 2. The relay lens 3 makes the illumination light form an image on the aperture stop 5 provided on the focal position of the condenser lens 6. The illumination light forming an image on the aperture stop 5 further illuminates a sample surface 7 in a state in which it is converted into parallel light by the condenser lens 6. Meanwhile, in the illumination apparatus 20, a mirror 4 is provided between the relay lens 3 and the aperture stop 5, in order to make the configuration of the illumination apparatus compact. In addition, while an example of using the illumination apparatus 20 as a transmission-illumination apparatus is illustrated here, this is not a particular limitation. For example, it may be used as an Epi-illumination apparatus.

Hereinafter, the collector lenses 10 are described in greater detail.

The collector lenses 10 are configured to include a first lens L1 having a positive power and a second lens L2 having a positive power, in the order of proximity to the light source. The first lens L1 has a first surface being approximately flat and a second surface being aspheric, in the order of proximity to the light source. The first lens L1 and the second lens L2 are designed to refract the illumination light from the light source 1 with a good balance on the respective four surfaces. This reduces the occurrence of aberration in the collector lenses 10, realizing good illumination performance. In addition, since the curvature radius of each surface is relatively large in the collector lenses 10 as described above, the degradation of illumination performance per manufacturing error (hereinafter, referred to as the influence of manufacturing error) becomes small. This realizes stable illumination performance of individual pieces of the collector lens 10, and improves the ease of the manufacture (manufacturability) of the collector lenses 10.

Meanwhile, in order to refract the illumination light on the respective four surfaces with a good balance, it is desirable that the first lens L1 and the second lens L2 satisfy the following conditional expression (1), where D1 is the thickness of the first lens L1 and D2 is the thickness of the second lens L2.

$$|(D1/D2)-1|<0.5 \tag{1}$$

The conditional expression (1) defines the relation between the thickness of the first lens L1 and the thickness of the second lens L2. By satisfying the conditional expression (1), the thickness of the first lens L1 and the thickness of the second lens L2 represent relatively close values. Therefore, the curvature radius of the respective surfaces of the first lens L1 and the second lens L2 become close, making it possible to refract the illumination light on the respective surfaces with a good balance.

Meanwhile, in order to take in the illumination light sufficiently and to illuminate the illumination range evenly, it is desirable that the first lens L1 and the second lens L2 satisfy the following conditional expression (2), where FL1 is the focal length of the first lens L1 and FL2 is the focal length of the second lens L2.

$$FL1<FL2 \tag{2}$$

The conditional expression (2) defines the relation between the focal length of the first lens L1 and the focal length of the second lens L2. By making the focal length of the first lens L1 that is closer to the light source shorter than that of the second lens L2, it becomes possible for the first lens L1 to take in the illumination light with a good balance with a strong refractive power and to guide it to the second lens L2. This improves the evenness of the illumination.

Furthermore, the shape of the first lens L1 also contributes to manufacturability and the stability of illumination performance. Compared to the case of using a meniscus lens having a high-concave surface as the lens closest to the light source, since the first surface is approximately flat, manufacturing error occurring in the formation of the first lens L1 is reduced, improving manufacturability. In addition, since the first lens L1 does not have a high-concave surface, the spherical aberration generated in the first lens L1 becomes relatively small. This makes it possible to make the aspheric coefficient of the aspheric surface used for the correction of the aberration small. As a result, the influence of manufacturing error occurring on the aspheric surface is reduced, improving the stability of illumination performance and the manufacturability of the lens. In addition, the shape of the first lens L1 is less affected by the change of its relative position with respect to the light source, compared to the case of a meniscus lens. This also contributes for improvement of the manufacturability of the lens and the stability of illumination performance.

Meanwhile, it is desirable that the first surface of the first lens L1 has flatness of about a level that satisfies the following conditional expression (3), where DL is the distance between the light source 1 and the first lens L1, R1 is the curvature radius of the first surface of the first lens L1, and R2 is the curvature radius of the second surface of the first lens L1.

$$(D1/DL)+|R2/R1|<1 \quad (3)$$

The conditional expression (3) defines the thickness of the first lens L1 and the curvature radius of each surface. The first term of the conditional expression (3) takes a smaller value with smaller thickness of the first lens L1. In other words, the first term limits the curvature radius that each surface of the first lens L1 may take, by limiting the thickness of the first lens L1.

Meanwhile, the second term is the ratio of the curvature radius of each surface of the first lens L1, which basically takes a smaller value with the shape of the first surface closer to flat. However, in a case in which the curvature radius for the second surface is significantly small, even if the curvature radius of the first surface is small, that is, even if the shape of the first surface is far from being flat, the second term takes a small value. However, since the first term limits the thickness of the first lens L1, the possible curvature radius is relatively large. Therefore, the second term actually represents a small value only when the shape of the first lens L1 is close to flat.

Given these, the shape of the first surface becomes approximately flat by keeping the sum of the first term and the second term of the conditional expression (3) to a small value, that is, below 1.

By configuring the collector lenses 10 as described above, it becomes possible for the illumination apparatus 20 and the microscope 100 including the collector lenses 10 to realize excellent manufacturability and stable illumination performance.

Furthermore, it is desirable that at least one of the first lens L1 and the second lens L2 is formed by a resin material. As the resin material, polycarbonate resin, acrylic resin, ZEONEX (a trade name of a product of ZEON Corporation) may be used. By using a resin material, manufacturing costs can be reduced compared with the case of using glass materials. In addition, the lens formation using a resin material facilitates the formation of the aspheric surface with good accuracy, improving manufacturability and stabilizing illumination performance.

On the other hand, the refraction index of a resin material is generally smaller than that of a glass material. However, the collector lenses 10 make it possible to realize good illumination performance even in a case in which a material with a small refraction index such as a resin material is used, by refracting light on the four surface with a good balance. Meanwhile, in a case of using a resin material, if the thickness of the lens is too large, distortion may occur within the lens when the resin lens is cooled. However, as described earlier, the thickness of the first lens L1 and the thickness of the second lens L2 are relatively close, and the thickness of either one of the lenses does not become too large. In the case of using a resin material, it is desirable for the collector lenses 10 to satisfy the conditional expression (1) also in the viewpoint of reducing the occurrence of distortion.

Meanwhile, the light source 1 may be an LED light source. The light source 1 may be a light source configured to include an optical fiber and to emit light entered from one end of the optical fiber from another end. In the case of using a resin material in particular, since the resin material is easily affected by the influence of heat, it is preferable to use a light source such as the LED light source that generates less heat. In addition, in a light source including an optical fiber, it is possible to reduce heat generation by providing a filter to suppress the transmission of heat inside. Therefore, it is preferable particularly for the case of using a resin material, for the same reason as for the LED light source.

Hereinafter, the collector lenses in each embodiment are described specifically.

Embodiment 1

Figure 2:
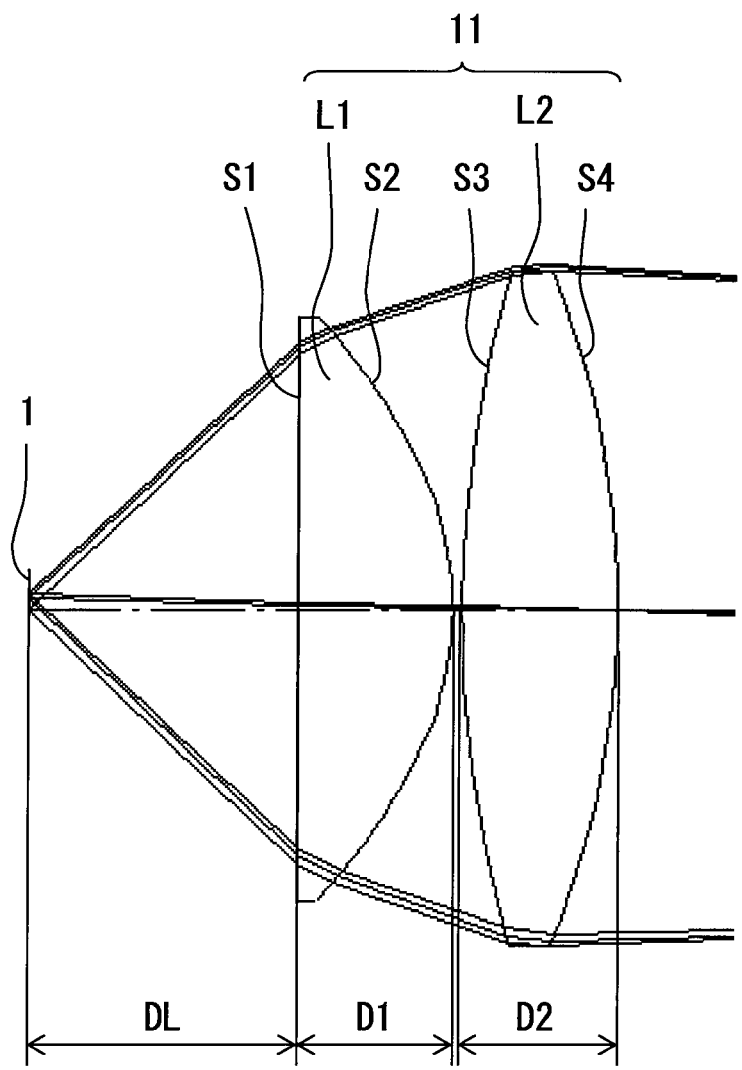
FIG. 2 is a diagram illustrating the configuration of collector lenses according to embodiment 1 of the present invention.

FIG. 2 is a diagram illustrating the configuration of collector lenses according to the present embodiment. Collector lenses 11 in this embodiment consist of a first lens L1 having a positive power and including a first surface S1 and a second surface S2, and a second lens L2 having a positive power and including a third surface S3 and a fourth surface S4, in the order of proximity to the light source.

The material of both the first lens L1 and the second lens L2 is polycarbonate resin. In addition, the first surface S1 is flat, and the second surface S2 is aspheric. Both the third surface S3 and the fourth surface S4 are convex (spherical)

Hereinafter, various data of the collector lenses 11 in this embodiment are described.

The focal length FL of the collector lenses 11, the focal length FL1 of the first lens L1 and the focal length FL2 of the second lens L2 are respectively as follows.
FL=25.8 mm, FL1=39.8 mm, FL2=65.4 mm The lens data of the collector lenses 11 are as follows, where "s" represents the surface number, "r" represents the curvature radius (mm), "d" represents the surface separation (mm), "nd" represents the refraction index with respect to the d line, "vd" represents the Abbe number with respect to the d line, and the outer diameter represent the outer diameter (mm) of the lens. The surface represented with the surface number 0 is the surface on the light source 1.

| collector lenses 11 | | | | | |
|---|---|---|---|---|---|
| s | r | d | nd | vd | outer diameter |
| 0 | INF | 17.5278 | | | |
| 1 | INF | 10.0338 | 1.52 | 55.7 | 19 |
| 2* | −35.0.58 | 0.5787 | | | 19 |
| 3 | 78.0124 | 10.0261 | 1.52 | 55.7 | 22 |
| 4 | −58.7476 | | | | 22 |

The aspheric coefficients of the second surface S2 are as follows.
K=0, A2=−9.62×10⁻³, A4=3.60×10⁻⁶, A6=−1.63×10⁻⁸, A8=3.70×10⁻¹¹

The collector lenses 11 satisfy the conditional expressions (1) through (3) as shown below. The expressions (C11) through (C13) correspond to the conditional expressions (1) through (3), respectively.

$$|(D1/D2)-1|\cong 0.000768<0.5 \quad (C11)$$

$$FL1-FL2=-25.6<0 \quad (C12)$$

$$(D1/DL)+|R2/R1|\cong 0.57<1 \quad (C13)$$

Figure 3A:
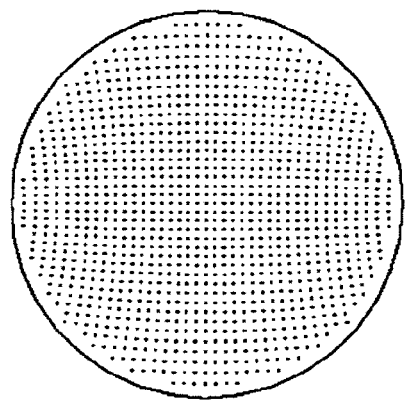
FIG. 3A is a diagram illustrating the distribution of a light beam emitted from a light source with equal angles and in a lattice form after transmitting through the collector lens of FIG. 2.
Figure 3B:
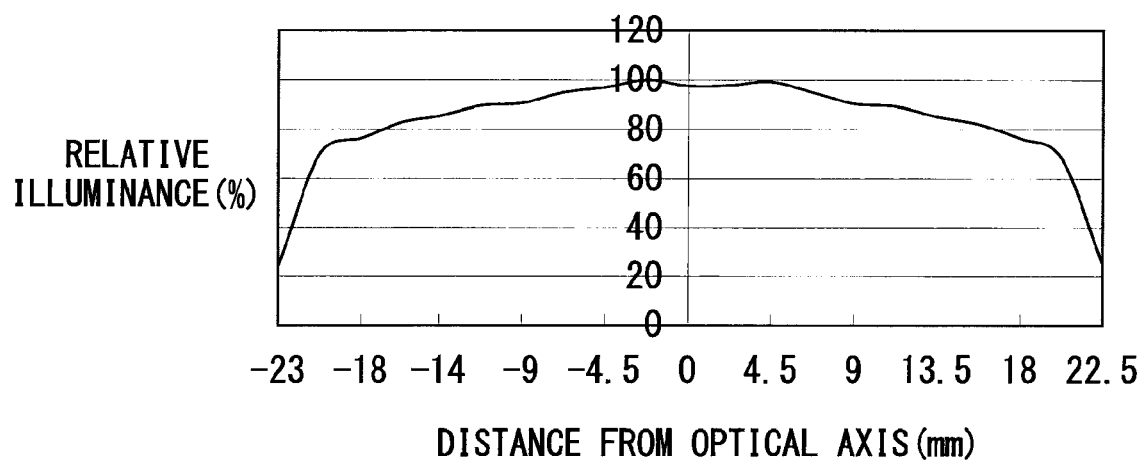
FIG. 3B is a diagram illustrating the illuminance distribution in a case in which the light source is an ideal light source with the light distribution angle being even, where the highest illuminance of the illumination light emitted from the collector lens of FIG. 2 is set to 100%.

FIG. 3A and FIG. 3B are diagrams for illustrating the illumination performance of the collector lenses 11, and represent the illuminance distribution of illumination light emitted from the collector lenses 11. The illuminance distribution illustrated here is the distribution in a case in which the light source 1 is a surface-emitting light source having a diameter of 1 mm, being an ideal light source with the brilliance and the light distribution angle being even within the surface. As illustrated in FIG. 3A and FIG. 3B, illumination having approximately-even illuminance distribution is realized. More precisely, the collector lenses 11 show good illuminance distribution in which the illuminance is highest on the optical axis, and declines moderately as the distance from the optical axis becomes larger.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 2

FIG. 4 is a diagram illustrating collector lenses according to the present embodiment. The lens configuration of the collector lenses 12 in this embodiment is the same as that in embodiment 1. However, the material of both the first lens L1 and the second lens L2 is acrylic resin.

Hereinafter, various data of the collector lenses 12 in this embodiment are described.

The focal length FL of the collector lenses 12, the focal length FL1 of the first lens L1 and the focal length FL2 of the second lens L2 are respectively as follows.
FL=27 mm, FL1=41.8 mm, FL2=70 mm The lens data of the collector lenses 12 are as follows, where "s" represents the surface number, "r" represents the curvature radius (mm), "d" represents the surface separation (mm), "nd" represents the refraction index with respect to the d line, "vd" represents the Abbe number with respect to the d line, and the outer diameter represent the outer diameter (mm) of the lens. The surface represented with the surface number 0 is the surface on the light source 1.

| collector lenses 12 | | | | | |
|---|---|---|---|---|---|
| s | r | d | nd | vd | outer diameter |
| 0 | INF | 18.9873 | | | |
| 1 | INF | 10 | 1.49 | 57.8 | 19 |
| 2* | −20.5938 | 0.75 | | | 19 |
| 3 | 58 | 9.5 | 1.49 | 57.8 | 22 |
| 4 | −80.5 | | | | 22 |

The aspheric coefficients of the second surface S2 are as follows.
$K=-1$, $A2=0$, $A4=-2.62\times10^{-6}$, $A6=2.60\times10^{-8}$, $A8=-6.84\times10^{-12}$ The collector lenses 12 satisfy the conditional expressions (1) through (3) as shown below. The expressions (C21) through (C23) correspond to the conditional expressions (1) through (3), respectively.

$$|(D1/D2)-1|\cong 0.053<0.5 \quad (C21)$$

$$FL1-FL2=-28.2<0 \quad (C22)$$

$$(D1/DL)+|R2/R1|\cong 0.53<1 \quad (C23)$$

FIG. 5A and FIG. 5B are diagrams for illustrating the illumination performance of the collector lenses 12, and represent the illuminance distribution of illumination light emitted from the collector lenses 12. The light source 1 is the same ideal light source as that in embodiment 1. As illustrated in FIG. 5A and FIG. 5B, illumination having approximately-even illuminance distribution is realized. More precisely, the collector lenses 12 show good illuminance distribution in which the illuminance is highest on the optical axis, and declines moderately as the distance from the optical axis becomes larger.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 3

Figure 6:
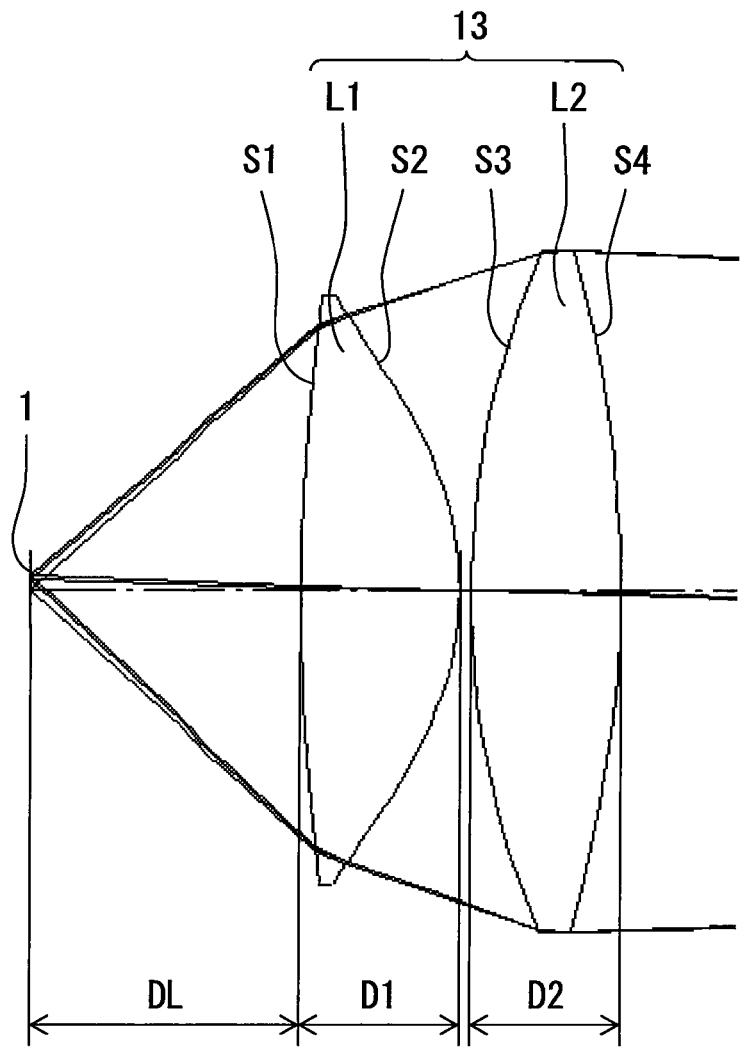
FIG. 6 is a diagram illustrating the configuration of collector lenses according to embodiment 3 of the present invention.

FIG. 6 is a diagram illustrating the configuration of collector lenses according to the present embodiment. The collector lenses 13 in this embodiment differ from the collector lenses 12 in embodiment 2 in that the first surface S1 is a low-convex surface. The convex surface of this level has little influence on manufacturability. Other configurations and the material are the same as those in embodiment 2.

Hereinafter, various data of the collector lenses 13 in this embodiment are described.

The focal length FL of the collector lenses 13, the focal length FL1 of the first lens L1 and the focal length FL2 of the second lens L2 are respectively as follows.
FL=25.1 mm, FL1=37.1 mm, FL2=69.2 mm The lens data of the collector lenses 13 are as follows.

| collector lenses 13 | | | | | |
|---|---|---|---|---|---|
| s | r | d | nd | vd | outer diameter |
| 0 | INF | 17.6028 | | | |
| 1 | 150 | 10 | 1.49 | 57.8 | 19 |
| 2* | −20.3545 | 0.75 | | | 19 |
| 3 | 56.7764 | 9.5 | 1.49 | 57.8 | 22 |
| 4 | −80.5036 | | | | 22 |

The aspheric coefficients of the second surface S2 are as follows.
$K=-1$, $A2=0$, $A4=-2.62\times10^{-6}$, $A6=2.60\times10^{-8}$, $A8=-3.76\times10^{-13}$ The collector lenses 13 satisfy the conditional expressions (1) through (3) as shown below. The expressions (C31) through (C33) correspond to the conditional expressions (1) through (3), respectively.

$$|(D1/D2)-1|\cong 0.053<0.5 \quad (C31)$$

$$FL1-FL2=-32.1<0 \quad (C32)$$

$$(D1/DL)+|R2/R1|\cong 0.70<1 \quad (C33)$$

FIG. 7A and FIG. 7B are diagrams for illustrating the illumination performance of the collector lenses 13, and represent the illuminance distribution of illumination light emitted from the collector lenses 13. The light source 1 is the same ideal light source as that in embodiment 1. As illustrated in FIG. 7A and FIG. 7B, illumination having approximately-even illuminance distribution is realized also by the collector lenses 13. More precisely, the collector lenses 13 show good illuminance distribution in which the illuminance is highest on the optical axis, and declines moderately as the distance from the optical axis becomes larger, as well as the collector lenses 12.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 4

Figure 8:
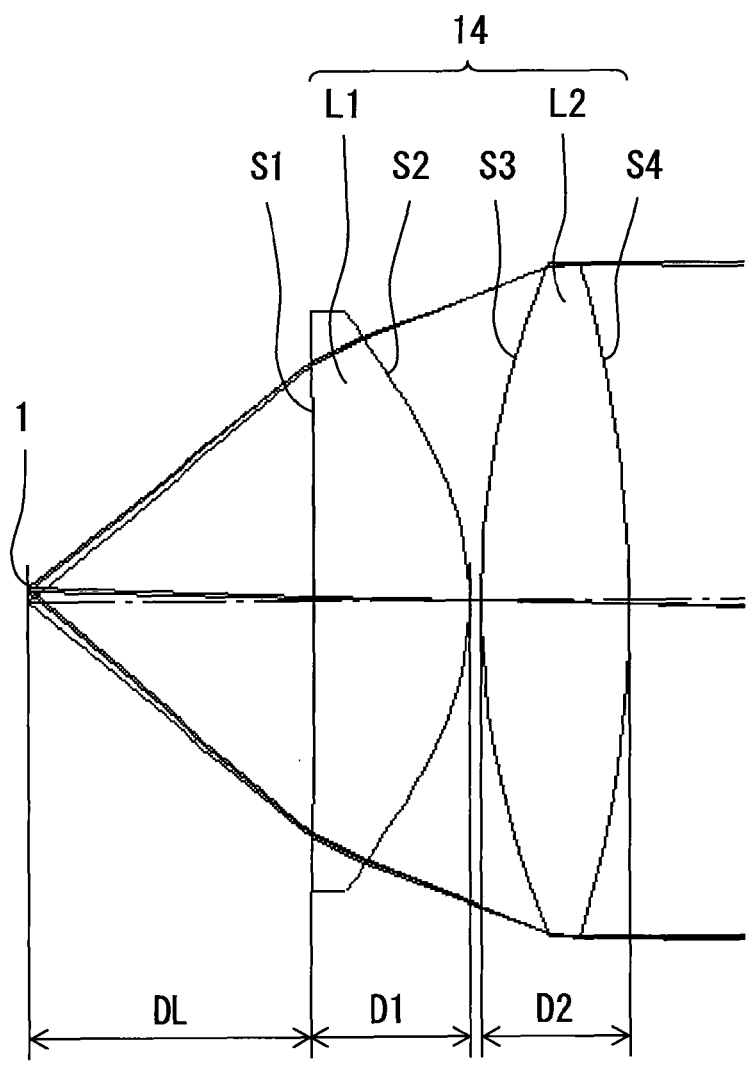
FIG. 8 is a diagram illustrating the configuration of collector lenses according to embodiment 4 of the present invention.

FIG. 8 is a diagram illustrating the configuration of collector lenses according to the present embodiment. The collector lenses 14 in this embodiment differ from the collector lenses 12 in embodiment 2 in that the first surface S1 is a low-concave surface. The concave surface of this level has little influence on manufacturability. Other configurations and the material are the same as those in embodiment 2.

Hereinafter, various data of the collector lenses 14 in this embodiment are described.

The focal length FL of the collector lenses 14, the focal length FL1 of the first lens L1 and the focal length FL2 of the second lens L2 are respectively as follows.
FL=27 mm, FL1=42.2 mm, FL2=69.2 mm
The lens data of the collector lenses 14 are as follows.

| collector lenses 14 | | | | | |
|---|---|---|---|---|---|
| s | r | d | nd | vd | outer diameter |
| 0 | INF | 18.8996 | | | |
| 1 | −800 | 10 | 1.49 | 57.8 | 19 |
| 2* | −20.3545 | 0.75 | | | 19 |
| 3 | 56.7764 | 9.5 | 1.49 | 57.8 | 22 |
| 4 | −80.5036 | | | | 22 |

The aspheric coefficients of the second surface S2 are as follows.
$K=-1$, $A2=0$, $A4=-2.62\times10^{-6}$, $A6=2.60\times10^{-8}$, $A8=-3.76\times10^{-13}$ The collector lenses 14 satisfy the conditional expressions (1) through (3) as shown below. The expressions (C41) through (C43) correspond to the conditional expressions (1) through (3), respectively.

$$|(D1/D2)-1|=0.053<0.5 \quad (C41)$$

$$FL1-FL2=-27.0<0 \quad (C42)$$

$$(D1/DL)+|R2/R1|\cong 0.55<1 \quad (C43)$$

FIG. 9A and FIG. 9B are diagrams for illustrating the illumination performance of the collector lenses 14, and represent the illuminance distribution of illumination light emitted from the collector lenses 14. The light source 1 is the same ideal light source as that in embodiment 1. As illustrated in FIG. 9A and FIG. 9B, illumination having approximately-even illuminance distribution is realized also by the collector lenses 14. More precisely, the collector lenses 14 show good illuminance distribution in which the illuminance is highest on the optical axis, and declines moderately as the distance from the optical axis becomes larger, as well as the collector lenses 12.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 5

Figure 10:
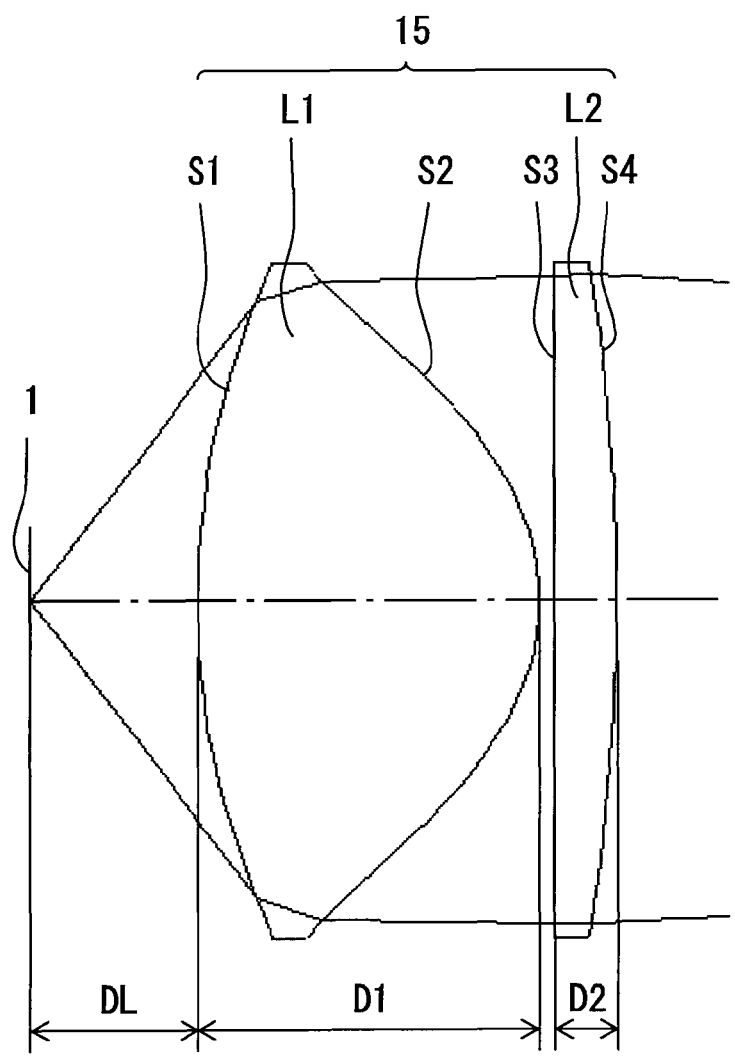
FIG. 10 is a diagram illustrating the configuration of collector lenses according to embodiment 5 of the present invention.

FIG. 10 is a diagram illustrating the collector lens configuration according to the present embodiment. In the collector lenses 15 in this embodiment, both the first lens L1 and the second lens L2 have a positive power. The first surface S1 is convex (spherical), the second surface S2 is aspheric, the third surface S3 is flat, and the fourth surface S4 is convex (spherical). The material of the first lens L1 and the second lens L2 is glass.

In the collector lenses 15, the first surface S1 has a relatively small curvature radius. However, since the first surface S1 is convex, manufacturability does not decline significantly as in the case of a concave surface.

Hereinafter, various data of the collector lenses 15 in this embodiment are described.

The focal length FL of the collector lenses 15, the focal length FL1 of the first lens L1 and the focal length FL2 of the second lens L2 are respectively as follows.
FL=24.4 mm, FL1=26 mm, FL2=280.4 mm
The lens data of the collector lenses 15 are as follows.

| collector lenses 15 | | | | | |
|---|---|---|---|---|---|
| s | r | d | nd | vd | outer diameter |
| 0 | INF | 10.8 | | | |
| 1 | 53.4 | 22.5 | 1.52 | 59.8 | 22 |
| 2* | −15.6 | 1.1 | | | 22 |
| 3 | INF | 4 | 1.51 | 64.1 | 22 |
| 4 | −144.8 | | | | 22 |

The aspheric coefficients of the second surface S2 are as follows.
$K=-1$, $A2=0$, $A4=-1.1\times10^{-5}$, $A6=-3.8\times10^{-10}$, $A8=1.0\times10^{-10}$, $A10=-9.3\times10^{-14}$ The collector lenses 15 satisfy the conditional expression (2) but do not satisfy the conditional expressions (1) and (3) as described below. The expressions (C51) through (C53) correspond to the conditional expressions (1) through (3), respectively.

$$|(D1/D2)-1|=4.625>0.5 \quad (C51)$$

$$FL1-FL2=-254.5<0 \quad (C52)$$

$$(D1/DL)+|R2/R1|\cong 2.27>1 \quad (C53)$$

FIG. 11A and FIG. 11B are diagrams for illustrating the illumination performance of the collector lenses 15, and represent the illuminance distribution of illumination light emitted from the collector lenses 15. The light source 1 is the same ideal light source as that in embodiment 1. As illustrated in FIG. 11A and FIG. 11B, with the collector lenses 15, the illuminance is low in the vicinity of the optical axis compared to that in peripheral areas.

As described above, this embodiment can also provide an illumination apparatus that realizes relatively good manufacturability and stable illumination performance, as well as a microscope having the illumination apparatus.

Embodiment 6

FIG. 12 is a diagram illustrating the configuration of collector lenses according to the present embodiment. The collector lenses 16 of this embodiment differ from the collector lenses 11 of embodiment 1 in that the fourth surface S4 is aspheric. Thus, the collector lenses 16 has a configuration in which the correction of aberration can be performed easier compared with embodiment 1, since the collector lenses 16 include an aspheric surface respectively in the first lens L1 and the second lens L2. The material of both the first lens L1 and the second lens L2 is ZEONEX (a trade name of a product of ZEON Corporation). Other configurations are the same as those in embodiment 1.

Hereinafter, various data of the collector lenses 16 in this embodiment are described.

The focal length FL of the collector lenses 16, the focal length FL1 of the first lens L1 and the focal length FL2 of the second lens L2 are respectively as follows.
FL=28.3 mm, FL1=46.4 mm, FL2=64.7 mm The lens data of the collector lenses 16 are as follows, where "s" represents the surface number, "r" represents the curvature radius (mm), "d" represents the surface separation (mm), "nd" represents the refraction index with respect to the d line, "vd" represents the Abbe number with respect to the d line, and the outer diameter represent the outer diameter (mm) of the lens. The surface represented with the surface number 0 is the surface on the light source 1.

| collector lenses 16 ||||||
| s | r | d | nd | vd | outer diameter |
| --- | --- | --- | --- | --- | --- |
| 0 | INF | 19.5492 | | | |
| 1 | INF | 10 | 1.52 | 55.7 | 20 |
| 2* | −35.058 | 0.543 | | | 20 |
| 3 | 100.1267 | 10 | 1.52 | 55.7 | 22 |
| 4* | −58.7476 | | | | 22 |

The aspheric coefficients of the second surface S2 and the fourth surface S4 are as follows.
Second Surface S2
$K=0$, $A2=-6.25\times10^{-3}$, $A4=3.60\times10^{-6}$, $A6=-1.63\times10^{-8}$, $A8=2.61\times10^{-11}$
Fourth Surface S4
$K=0$, $A2=-1.54\times10^{-3}$, $A4=2.74\times10^{-6}$, $A6=5.00\times10^{-10}$, $A8=-7.95\times10^{-13}$ The collector lenses 16 satisfy the conditional expressions (1) through (3) as shown below. The expressions (C61) through (C63) correspond to the conditional expressions (1) through (3), respectively.

$|(D1/D2)-1|=0<0.5$      (C61)

$FL1-FL2=-18.3<0$      (C62)

$(D1/DL)+|R2/R1|\cong 0.51<1$      (C63)

FIG. 13A and FIG. 13B are diagrams for illustrating the illumination performance of the collector lenses 16, and represent the illuminance distribution of illumination light emitted from the collector lenses 16. The light source 1 is the same ideal light source as that in embodiment 1. As illustrated in FIG. 13A and FIG. 13B, illumination having approximately-even illuminance distribution is realized. More precisely, the collector lenses 16 show good illuminance distribution in which the illuminance is highest on the optical axis, and declines moderately as the distance from the optical axis becomes larger.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 7

FIG. 14 is a diagram illustrating the configuration of collector lenses according to the present embodiment. The collector lenses 17 in this embodiment differ from the collector lenses 16 in embodiment 6 in that the material of the first lens L1 and the second lens L2 is polycarbonate resin. Other configurations are the same as those in embodiment 6.

Hereinafter, various data of the collector lenses 17 in this embodiment are described.

The focal length FL of the collector lenses 17, the focal length FL1 of the first lens L1 and the focal length FL2 of the second lens L2 are respectively as follows.
FL=25.9 mm, FL1=41.6 mm, FL2=60.7 mm The lens data of the collector lenses 17 are as follows, where "s" represents the surface number, "r" represents the curvature radius (mm), "d" represents the surface separation (mm), "nd" represents the refraction index with respect to the d line, "vd" represents the Abbe number with respect to the d line, and the outer diameter represent the outer diameter (mm) of the lens. The surface represented with the surface number 0 is the surface on the light source 1.

| collector lenses 17 ||||||
| s | r | d | nd | vd | outer diameter |
| --- | --- | --- | --- | --- | --- |
| 0 | INF | 17.5136 | | | |
| 1 | INF | 10 | 1.58 | 30.4 | 20 |
| 2* | −35.0497 | 0.543 | | | 20 |
| 3 | 116.016 | 10 | 1.58 | 30.4 | 22 |
| 4* | −58.6457 | | | | 22 |

The aspheric coefficients of the second surface S2 and the fourth surface S4 are as follows.
Second Surface S2
$K=0$, $A2=-6.28\times10^{-3}$, $A4=2.32\times10^{-9}$, $A6=1.06\times10^{-9}$, $A8=5.45\times10^{-11}$
Fourth Surface S4
$K=0$, $A2=-1.58\times10^{-3}$, $A4=-5.05\times10^{-11}$, $A6=-3.48\times10^{-10}$, $A8=0$ The collector lenses 17 satisfy the conditional expressions (1) through (3) as shown below. The expressions (C71) through (C73) correspond to the conditional expressions (1) through (3), respectively.

$|(D1/D2)-1|=0<0.5$      (C71)

$FL1-FL2=-19.1<0$      (C72)

$(D1/DL)+|R2/R1|\cong 0.57<1$      (C73)

FIG. 15A and FIG. 15B are diagrams for illustrating the illumination performance of the collector lenses 17, and represent the illuminance distribution of illumination light emitted from the collector lenses 17. The light source 1 is the same ideal light source as that in embodiment 1. As illustrated in FIG. 15A and FIG. 15B, illumination having approximately-even illuminance distribution is realized. More precisely, the collector lenses 17 show good illuminance distribution in which the illuminance is highest on the optical axis, and declines moderately as the distance from the optical axis becomes larger.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 8

FIG. 16 is a diagram illustrating the configuration of collector lenses according to the present embodiment. The collector lenses 18 in this embodiment differ from the collector lenses 16 in embodiment 6 in that the material of the first lens L1 and the second lens L2 is acrylic resin. Other configurations are the same as those in embodiment 6.

Hereinafter, various data of the collector lenses 18 in this embodiment are described.

The focal length FL of the collector lenses 18, the focal length FL1 of the first lens L1 and the focal length FL2 of the second lens L2 are respectively as follows.
FL=27 mm, FL1=41.8 mm, FL2=70 mm The lens data of the collector lenses 18 are as follows, where "s" represents the surface number, "r" represents the curvature radius (mm), "d" represents the surface separation (mm), "nd" represents the refraction index with respect to the d line, "vd" represents the Abbe number with respect to the d line, and the outer diameter represent the outer diameter (mm) of the lens. The surface represented with the surface number 0 is the surface on the light source 1.

| collector lenses 18 | | | | | |
|---|---|---|---|---|---|
| s | r | d | nd | vd | outer diameter |
| 0 | INF | 18.987 | | | |
| 1 | INF | 10 | 1.49 | 57.8 | 19 |
| 2* | −20.5938 | 0.75 | | | 19 |
| 3 | 58 | 9.5 | 1.49 | 57.8 | 22 |
| 4* | −80.5 | | | | 22 |

The aspheric coefficients of the second surface S2 and the fourth surface S4 are as follows.
Second Surface S2
$K=-1$, $A2=0$, $A4=-2.62\times10^{-6}$, $A6=2.60\times10^{-8}$, $A8=-6.84\times10^{-12}$
Fourth Surface S4
$K=-1$, $A2=0$, $A4=-3.45\times10^{-6}$, $A6=1.08\times10^{-8}$, $A8=-9.63\times10^{-12}$ The collector lenses 18 satisfy the conditional expressions (1) through (3) as shown below. The expressions (C81) through (C83) correspond to the conditional expressions (1) through (3), respectively.

$$|(D1/D2)-1|=0.05<0.5 \tag{C81}$$

$$FL1-FL2=-28.2<0 \tag{C82}$$

$$(D1/DL)+|R2/R1|\approx0.52<1 \tag{C83}$$

FIG. 17A and FIG. 17B are diagrams for illustrating the illumination performance of the collector lenses 18, and represent the illuminance distribution of illumination light emitted from the collector lenses 18. The light source 1 is the same ideal light source as that in embodiment 1. As illustrated in FIG. 17A and FIG. 17B, illumination having approximately-even illuminance distribution is realized. More precisely, the collector lenses 18 show good illuminance distribution in which the illuminance is highest on the optical axis, and declines moderately as the distance from the optical axis becomes larger.

As described above, according to this embodiment, an illumination apparatus that realizes excellent manufacturability and stable illumination performance, as well as a microscope having the illumination apparatus can be provided. In addition, this embodiment provides high evenness of illumination as well as good illuminance distribution.

Embodiment 9

Figure 18:
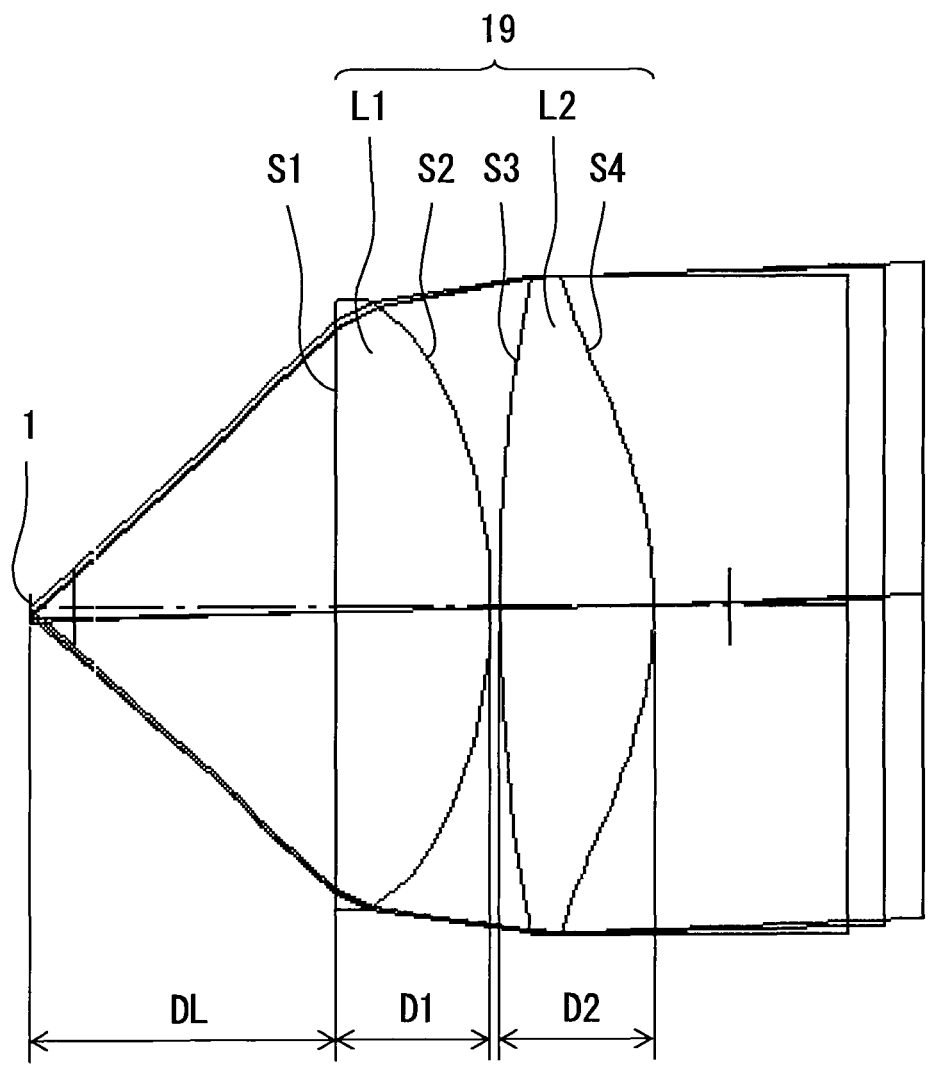
FIG. 18 is a diagram illustrating the configuration of collector lenses according to embodiment 9 of the present invention.

FIG. 18 is a diagram illustrating the configuration of collector lenses according to the present embodiment. The collector lenses 19 in this embodiment differ from the collector lenses 16 in embodiment 6 in that the material of the first lens L1 and the second lens L2 is acrylic resin, and that the focal length of the first lens L1 is longer than the focal length of the second lens L2. Other configurations are the same as those in embodiment 6.

Hereinafter, various data of the collector lenses 19 in this embodiment are described.

The focal length FL of the collector lenses 19, the focal length FL1 of the first lens L1 and the focal length FL2 of the second lens L2 are respectively as follows.
FL=30.7 mm, FL1=71.1 mm, FL2=49.5 mm The lens data of the collector lenses 19 are as follows.

| collector lenses 19 | | | | | |
|---|---|---|---|---|---|
| s | r | d | nd | vd | outer diameter |
| 0 | INF | 20.307 | | | |
| 1 | INF | 10 | 1.49 | 57.8 | 20 |
| 2* | −35.0373 | 0.5431 | | | 20 |
| 3 | 116.016 | 10 | 1.49 | 57.8 | 21 |
| 4* | −29.9899 | | | | 21 |

The aspheric coefficients of the second surface S2 and the fourth surface S4 are as follows.
Second Surface S2
$K=-1$, $A2=0$, $A4=2.92\times10^{-8}$, $A6=3.22\times10^{-9}$, $A8=-1.06\times10^{-10}$
Fourth Surface S4
$K=-1$, $A2=0$, $A4=-8.97\times10^{-8}$, $A6=8.07\times10^{-8}$, $A8=2.06\times10^{-11}$ The collector lenses 19 satisfy the conditional expressions (1) and (3) but do not satisfy the conditional expression (2) as shown below. The expressions (C91) through (C93) correspond to the conditional expressions (1) through (3), respectively.

$$|(D1/D2)-1|=0<0.5 \tag{C91}$$

$$FL1-FL2=21.6>0 \tag{C92}$$

$$(D1/DL)+|R2/R1|\approx0.49<1 \tag{C93}$$

FIG. 19A and FIG. 19B are diagrams for illustrating the illumination performance of the collector lenses 19, and represent the illuminance distribution of illumination light emitted from the collector lenses 19. The light source 1 is the same ideal light source as that in embodiment 1. As illustrated in FIG. 19A and FIG. 19B, with the collector lenses 19, the illuminance in the center part of the illumination range including the optical axis is lower than the illuminance in the outer circumference area of the illumination range.

As described above, this embodiment can also provide an illumination apparatus that realizes relatively good manufacturability and stable illumination performance, as well as a microscope having the illumination apparatus.

What is claimed is:

1. An illumination apparatus comprising:
    a light source; and
    a collimator optical system which converts light emitted from the light source to approximately-parallel light,
    wherein the collimator optical system consists of two lenses which are, in an order of proximity to the light source, a first lens having a positive power and a second lens having a positive power,
    wherein the first lens comprises, in an order of proximity to the light source, an approximately-flat first surface and an aspheric second surface, and
    wherein a following conditional expression is satisfied:

$$FL1 < FL2$$

where FL1 is a focal length of the first lens, and FL2 is a focal length of the second lens.

2. The illumination apparatus according to claim 1, wherein the light source is a LED light source.

3. The illumination apparatus according to claim 1, wherein at least one of the first lens and the second lens is formed with a resin material.

4. The illumination apparatus according to claim 1, wherein the second lens comprises an aspheric surface.

5. The illumination apparatus according to claim 1, wherein a following conditional expression is satisfied:

$$|(D1/D2) - 1| < 0.5$$

where D1 is a thickness of the first lens and D2 is a thickness of the second lens.

6. The illumination apparatus according to claim 1, further comprising, at an emitting side of the collimator optical system:
    a field stop; and
    a relay lens which makes the approximately-parallel light emitted from the collimator optical system form an image.

7. The illumination apparatus according to claim 6, further comprising:
    an aperture stop at a position at which the approximately-parallel light emitted from the collimator optical system forms an image; and
    a condenser lens which illuminates a sample surface,
    wherein a focal position of the condenser lens corresponds to the position of the aperture stop.

8. The illumination apparatus according to claim 1, wherein a following conditional expression is satisfied:

$$(D1/DL) + |R2/R1| < 1$$

where D1 is a thickness of the first lens, DL is a distance between the light source and the first lens, R1 is a radius of curvature of the first surface of the first lens, and R2 is a radius of curvature of the second surface of the first lens.

9. The illumination apparatus according to claim 1, wherein the second lens comprises, in an order of proximity to the light source, a first convex spherical surface and a second convex aspheric surface.

* * * * *